United States Patent
Mugford

(10) Patent No.: US 8,051,808 B2
(45) Date of Patent: Nov. 8, 2011

(54) ANIMAL HARNESS

(75) Inventor: Roger Arthur Mugford, Surrey (GB)

(73) Assignee: The Company of Animals Limited, Surrey (GB)

( * ) Notice: Subject to any disclaimer, the term of this patent is extended or adjusted under 35 U.S.C. 154(b) by 600 days.

(21) Appl. No.: 10/577,052

(22) PCT Filed: Oct. 22, 2004

(86) PCT No.: PCT/GB2004/004495
§ 371 (c)(1),
(2), (4) Date: Jan. 12, 2007

(87) PCT Pub. No.: WO2005/041645
PCT Pub. Date: May 12, 2005

(65) Prior Publication Data
US 2007/0266960 A1 Nov. 22, 2007

(30) Foreign Application Priority Data

Oct. 23, 2003 (GB) .................................. 0324767.3
Feb. 20, 2004 (GB) .................................. 0403859.2

(51) Int. Cl.
*A01K 27/00* (2006.01)
(52) U.S. Cl. ......... 119/792; 119/856; 119/863; 119/771
(58) Field of Classification Search .............. 119/856, 119/863, 771, 792
See application file for complete search history.

(56) References Cited

U.S. PATENT DOCUMENTS

| | | | | |
|---|---|---|---|---|
| 1,508,601 A * | 9/1924 | Huff | ............... | 119/792 |
| 1,800,421 A | 4/1931 | Wickersham et al. | | |
| 1,906,043 A | 4/1933 | Bernstein | | |
| 2,605,744 A | 8/1952 | Urbanski | ......... | 119/96 |
| 2,778,335 A * | 1/1957 | Hirsch | ........... | 119/793 |
| 4,676,198 A * | 6/1987 | Murray | .......... | 119/771 |
| 4,970,991 A | 11/1990 | Luce | ................ | 119/96 |
| D313,677 S * | 1/1991 | Hammon et al. | ............ | D30/152 |
| 5,247,905 A * | 9/1993 | Arakawa | ......... | 119/863 |
| 5,370,083 A | 12/1994 | Sporn | ........... | 119/864 |
| 5,503,113 A | 4/1996 | Knight | .......... | 119/856 |
| 5,893,339 A * | 4/1999 | Liu | ................ | 119/792 |
| 6,314,915 B1 * | 11/2001 | Pope et al. | .................... | 119/712 |
| 6,374,771 B1 | 4/2002 | Zwickle | ........ | 119/28.5 |
| 6,450,130 B1 * | 9/2002 | Goldberg | ...... | 119/792 |
| 2004/0000273 A1 * | 1/2004 | Lady | ............. | 119/792 |
| 2006/0112903 A1 * | 6/2006 | Zutis et al. | .................... | 119/792 |

FOREIGN PATENT DOCUMENTS

GB 2228660 A 9/1990
WO 2004/002432 1/2004

* cited by examiner

*Primary Examiner* — Joshua Michener
(74) *Attorney, Agent, or Firm* — Jacobson Holman PLLC

(57) ABSTRACT

A harness for a quadruped animal including a chest strap which in use of the harness lies across the chest of the animal in front of the forelegs, the harness including an attachment for a leading strap, the attachment being slidably mounted on the chest strap for movement therealong. Each end of the chest strap is attached to a trunk loop which in use of the harness passes around the trunk of the animal behind the forelegs. The trunk loop includes a back strap which in use of the harness lies across the back of the animal affixed to a lower strap which in use of the harness passes under the animal behind the forelegs.

11 Claims, 6 Drawing Sheets

ANIMAL HARNESS

This is a nationalization of PCT/GB04/004495 filed Oct. 22, 2004 and published in English.

FIELD OF THE INVENTION

The present invention relates to a harness for animals, especially quadruped animals, and finds particular application in harnesses for dogs.

BACKGROUND OF THE INVENTION

Conventionally a dog is led by a leading strap, or lead, attached to a collar around the neck of the dog. A lead and collar is to an extent effective to restrain a dog, although it can be uncomfortable for a dog which pulls against the lead, but this arrangement cannot be used to guide the dog to turn to the left or right; it can only be used to pull the dog to the left or right. Harnesses which pass around the body of the dog and to which a lead is attached to the middle of the harness strap across the back of the dog are also known. Such a harness is effective to restrain a dog but again can only be used to pull a dog to the left or right; not to guide it.

A dog halter mounted around the nose and neck of the dog is also known. A neck loop is attached to a nose loop by cheek straps running between the neck and nose loops and a chin strap running between the neck loop and a cinch around the nose loop under the jaw of the dog. A lead is attached to the loop which passes through the cinch. Such a halter is sold under the registered trade mark HALTI®. This halter allows a dog to be restrained without discomfort to the dog and to be guided to the left or right, as the dog's head can be turned to the left or right by pulling on the lead.

It has been desired to provide a harness which can restrain a dog without discomfort and which can be used to guide the dog to the left or right, rather than simply pulling it. Harnesses may be preferable to halters for some dogs and other animals since the force exerted on the dog by the halter is spread over a wider and stronger part of the body of the dog. A dog harness provided by Soft Touch Concepts of Fremont, Calif., USA has an attachment point for a lead which is fixed on a strap which lies across the chest of the dog. However, when the lead is pulled to the left or right to turn the dog, the harness has a tendency to rotate around the dog which reduces its effectiveness and may be uncomfortable for the dog.

SUMMARY OF THE INVENTION

According to the invention there is provided a harness for a quadruped animal including a chest strap which in use of the harness lies across the chest of the animal in front of the forelegs, the harness including an attachment for a leading strap, the attachment being slidably mounted on the chest strap for movement therealong. Preferably, each end of the chest strap is attached to a trunk loop which in use of the harness passes around the trunk of the animal behind the forelegs. The trunk loop preferably comprises a back strap which in use of the harness lies across the back of the animal affixed to a lower strap which in use of the harness passes under the animal behind the forelegs. In one preferred embodiment of the invention, a second attachment for a leading strap is provided on the back strap.

Particularly preferably, the harness includes a stabilizing link, one end of which is mounted on the chest strap and the other end of which is adapted to be attached in use of the harness to a collar around the neck of the animal. More preferably, the stabilizing link is slidably mounted on the chest strap for movement therealong, and yet more preferably the attachment for a leading strap and the stabilizing link are connected so as to move together along the chest strap.

The straps of the harness may be of a webbing material or any other material appropriate for use in animal harness, and may be lined with neoprene or other soft material. Preferably, the material for the chest strap is chosen so that the attachment for the leading strap cannot move along it so easily that the harness is ineffective to guide the animal (in the manner described below in the description of a preferred embodiment). Synthetic webbing such as a polyester webbing has been found to be a suitable material for the chest strap.

Also according to the invention there is provided a method of controlling a dog or other quadruped animal comprising placing a harness according to the invention on the animal and attaching a leading strap to the or each attachment for a leading strap.

BRIEF DESCRIPTION OF THE DRAWINGS

The invention will be further described with reference to the drawings in which.

DETAILED DESCRIPTION OF THE PREFERRED EMBODIMENTS

Figure 1:
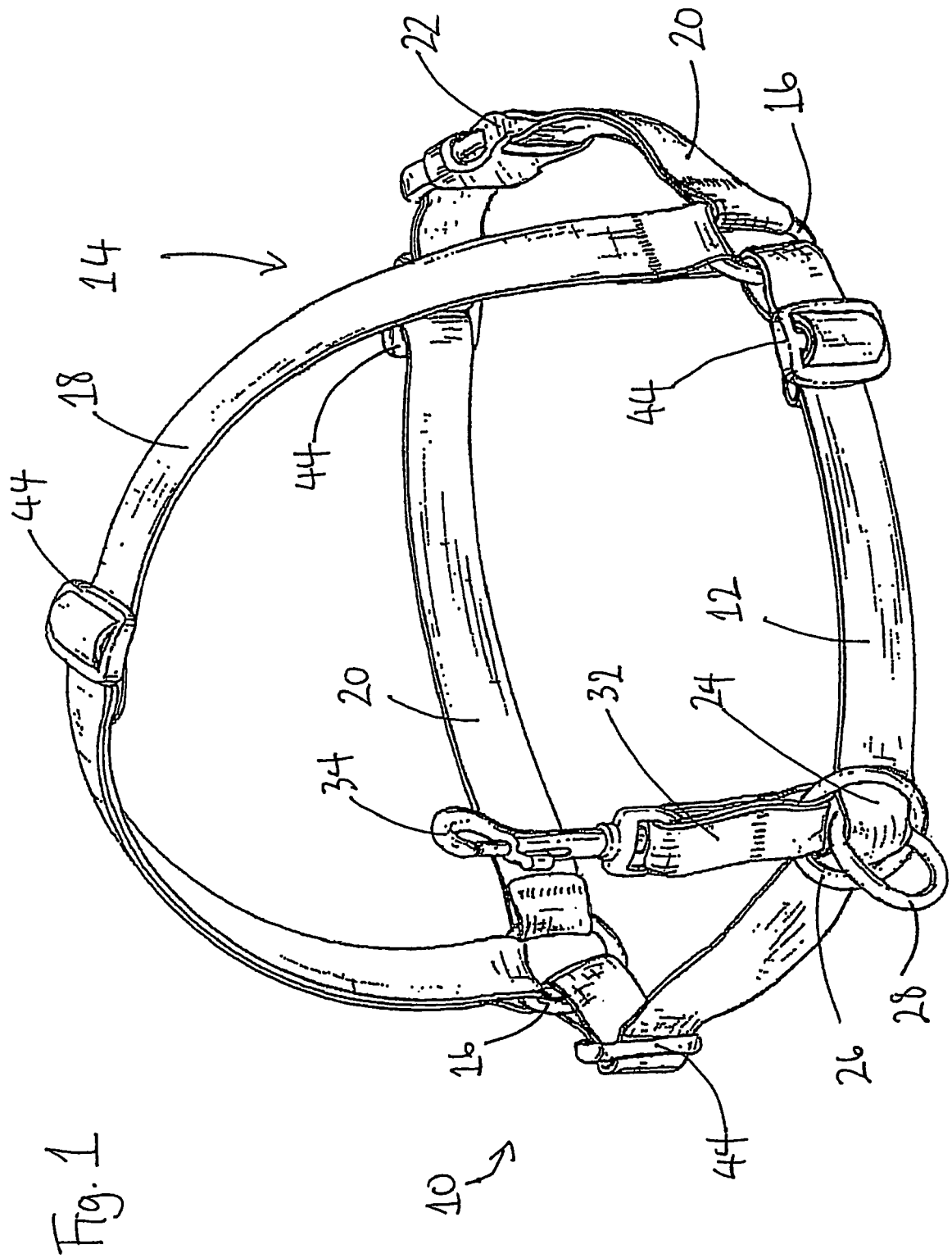
FIG. 1 is a perspective view of a harness according to a first preferred embodiment of the invention.
Figure 2:
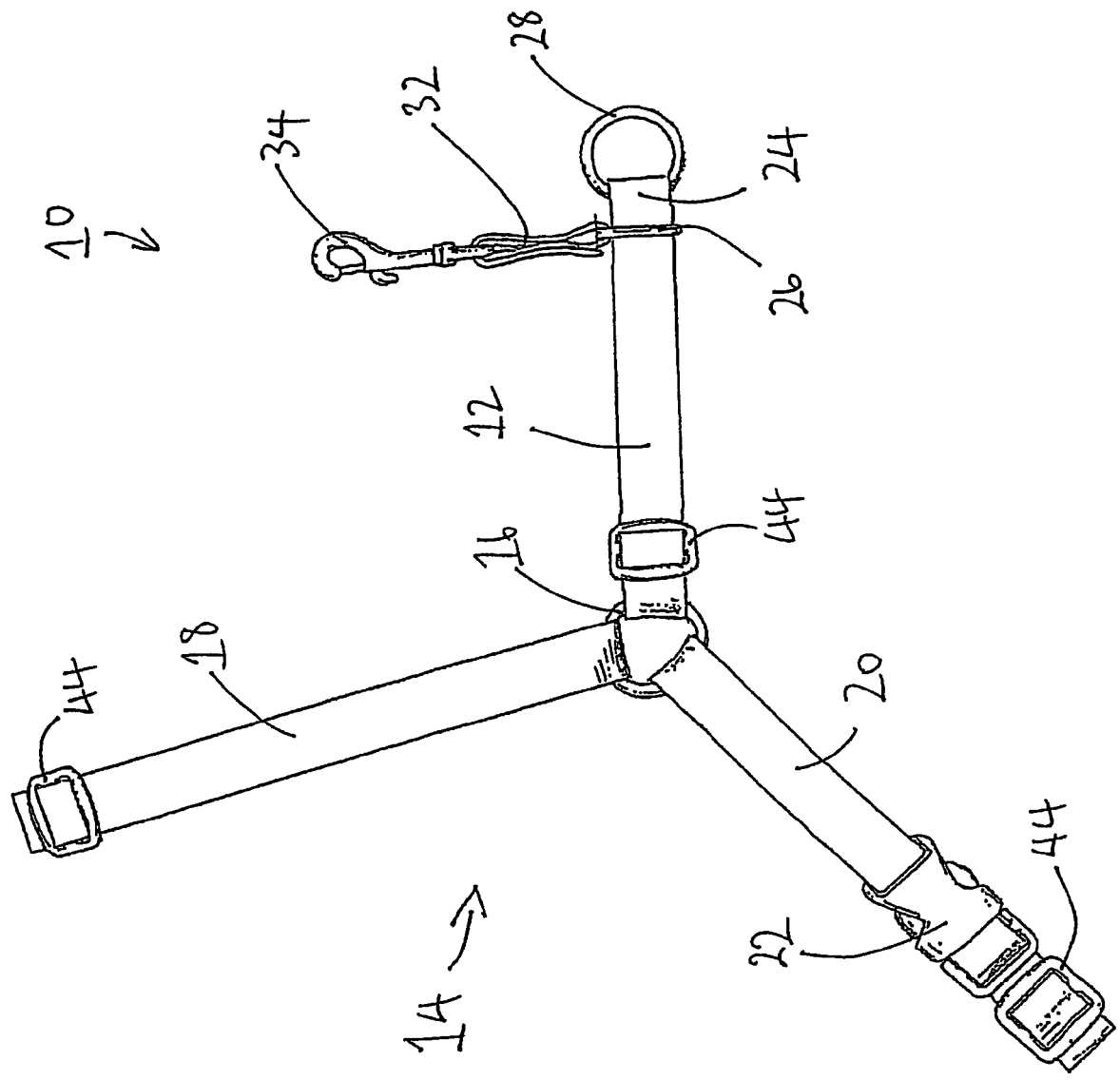
FIG. 2 is a side elevation of the harness of FIG. 1.
Figure 3:
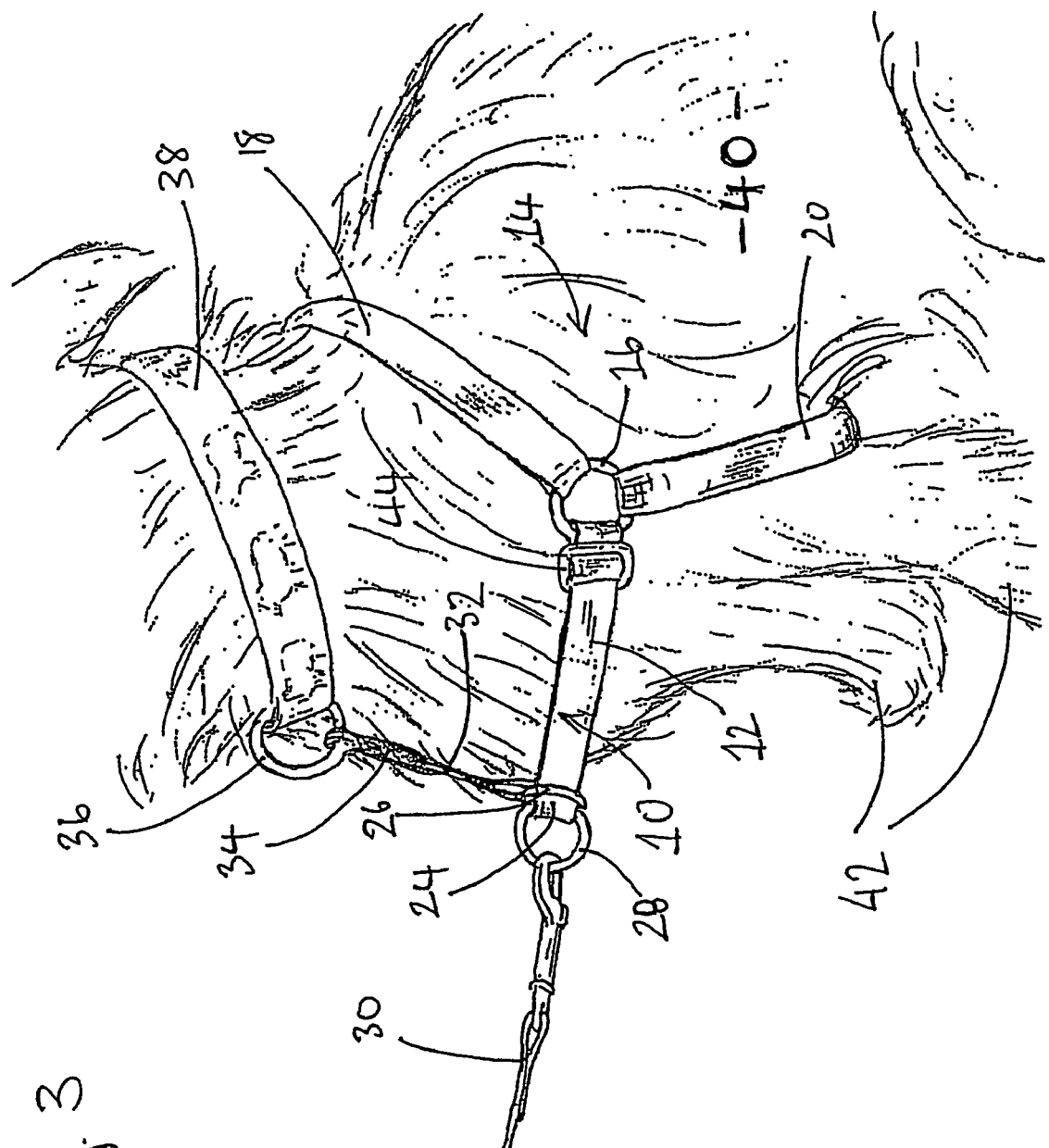
FIG. 3 shows the harness of FIGS. 1 and 2 on a dog.

The harness 10 of the first preferred embodiment of the invention shown in FIGS. 1, 2 and 3 of the drawings is for a dog. It comprises a chest strap 12 each end of which is attached to a trunk loop 14 by one of two pivot rings 16 in the trunk loop. The trunk loop 14 comprises a back strap 18 attached at each end to an end of a lower strap 20 by the pivot rings 16. The lower strap 20 includes a clasp 22 by which the trunk loop 14 can be opened.

A loop 24 of the chest strap 12 passes through a cinch ring 26 and is prevented from passing back through the cinch ring by a lead ring 28 to which a lead 30 can be attached; the portion of the chest strap forming the loop 24 passes through the lead ring 28. The lead ring 28 is of a diameter to prevent the cinch ring 26 from coming off the chest strap 12.

A stabilizing link consists of a stabilizing strap 32 attached to the cinch ring 26 and an openable spring clip 34 on the free end of the stabilizing strap 32. The stabilizing strap 32 is of such a length that when it is in place on a dog, the clip 34 can be attached to a ring 36 which is slidable on the collar 38 of a dog 40, as can be seen in FIG. 3, so that in use the chest strap 12 is retained in the correct position across the chest of the dog 40.

The chest 12, back 18 and lower 20 straps of the harness are provided with length adjusters 44 so that the harness can accommodate a range of sizes of dogs; the stabilizing strap 32 can also be provided with an adjuster.

In use, as can be seen in FIG. 3, the harness 10 is placed on a dog 40 so that the chest strap 12 passes across the chest of the dog in front of its forelegs 42, the back strap 18 passes over the back of the dog in the region of its forelegs 42 and the lower strap 20 passes under the dog immediately behind its forelegs 42. The clasp 22 in the lower strap 20 is opened to allow the harness to be placed around the dog 40 and closed when the harness is in position on the dog.

The clip 34 on the end of the stabilizing strap 32 is attached to a ring 36 slidable on a collar 38 around the neck of the dog. The stabilizing link 32, 34 helps to maintain the chest strap 12 in the correct position across the chest of the dog. A lead 30 is attached to the lead ring 28 on the chest strap 12.

When a dog wearing the harness 10 is being walked, the lead 30 can be held to either the left or right side of the dog. In normal forward walking, the cinch ring 26 and the lead ring 28 will lie midway across the chest of the dog. If the dog pulls against the lead, it is readily restrained; the stabilizing link 32 and clip 34 prevent the chest strap 12 from slipping back on the chest of the dog in this situation. It has been found that a dog wearing a harness according to the invention is less likely to pull against the lead than if it is being led otherwise.

To turn the dog in the direction of the side of the dog to which the lead passes, the lead is pulled gently in that direction. This causes the back strap 18 to apply gentle pressure to the dog in the region of its opposite shoulder and the dog is encouraged to turn toward the lead. At the same time, slippage of the harness 10 around the body of the dog is avoided by the lead ring 26 and the cinch ring 24, and so the stabilizing link 32 and clip 34, sliding along the chest strap 12 of the harness in the direction in which the lead is being pulled. The arrangement of the cinch ring 24 and the lead ring 26 means that the rings do not slide entirely freely on the chest strap 12, but slide sufficiently to avoid slippage of the harness while gentle pressure is applied to the opposite shoulder of the dog by the back strap 18. The chest strap 12 is restrained against backward movement on the dog's chest by the stabilizing link 32, 34.

To turn the dog in the other direction, the lead can be brought across in front of the dog so that it passes to the other side of the dog; the turning process is then as described above. Alternatively, the lead can remain on the same side of the dog, that is the side opposite to which the dog is to turn. The lead is gently pulled against the neck of the dog to urge it to turn away from the lead.

If a dog wearing a harness 10 is reluctant to walk forward, it can be encouraged to do so by gentle pulling of the lead.

The pivot rings 16 in the trunk loop 14 to which the chest 12, back 18 and lower 20 straps are attached allow the straps to move relative to each other without distortion. The harness can flex as the dog moves while the straps remain substantially flat on the dog's body.

Figure 4:
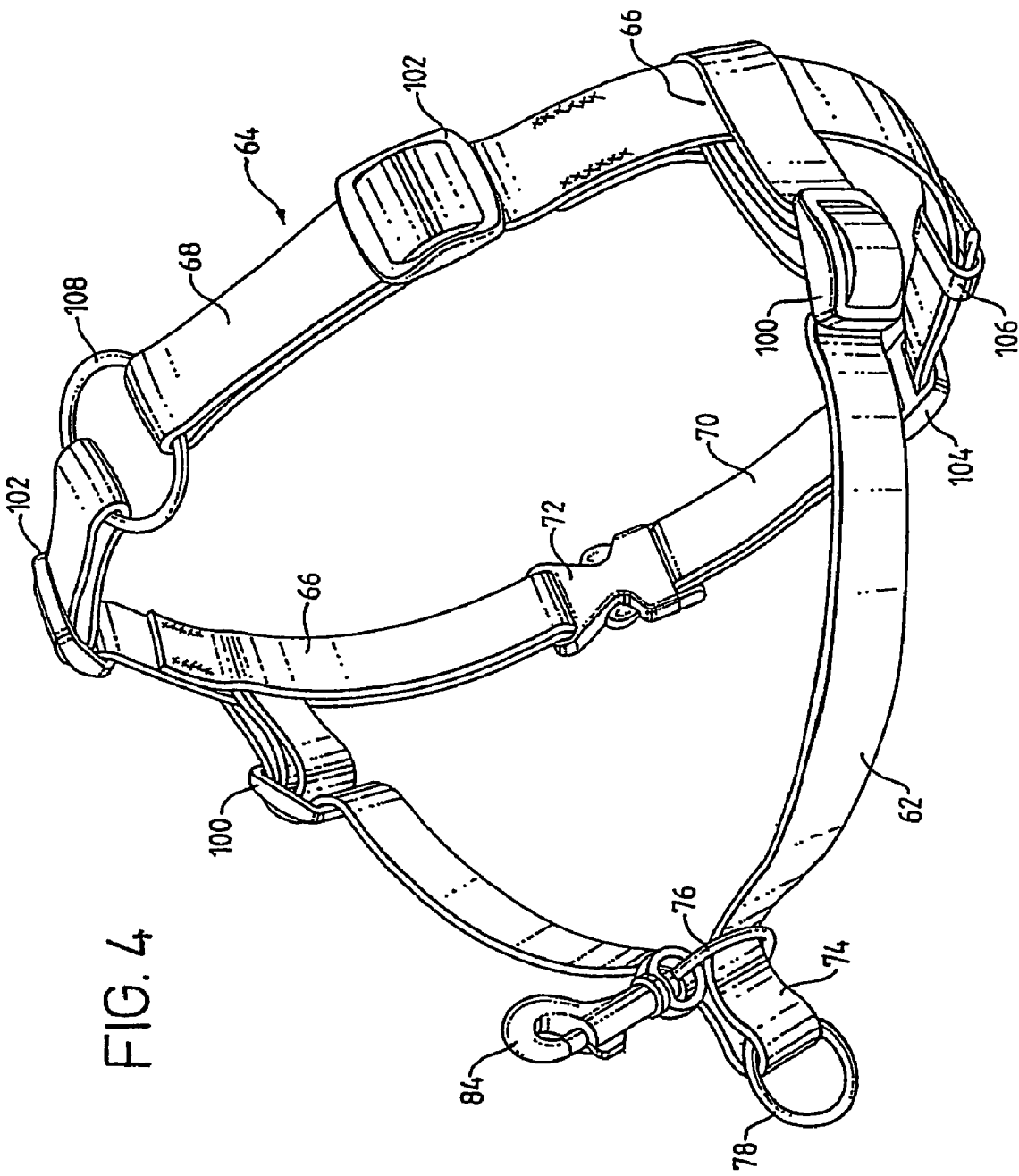
FIG. 4 is a perspective view of a harness according to a second preferred embodiment of the invention.
Figure 5:
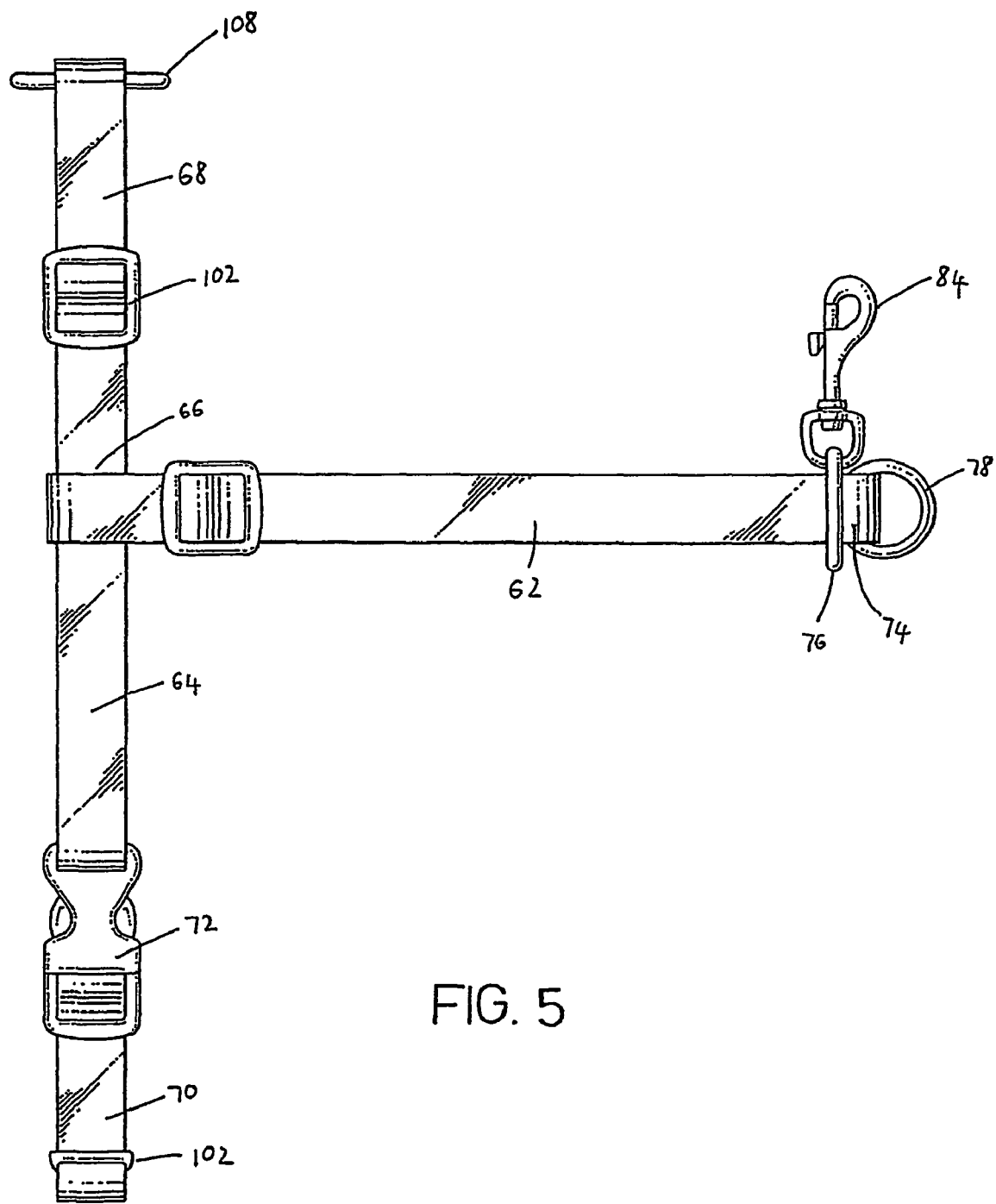
FIG. 5 is a side elevation of the harness of FIG. 4.
Figure 6:
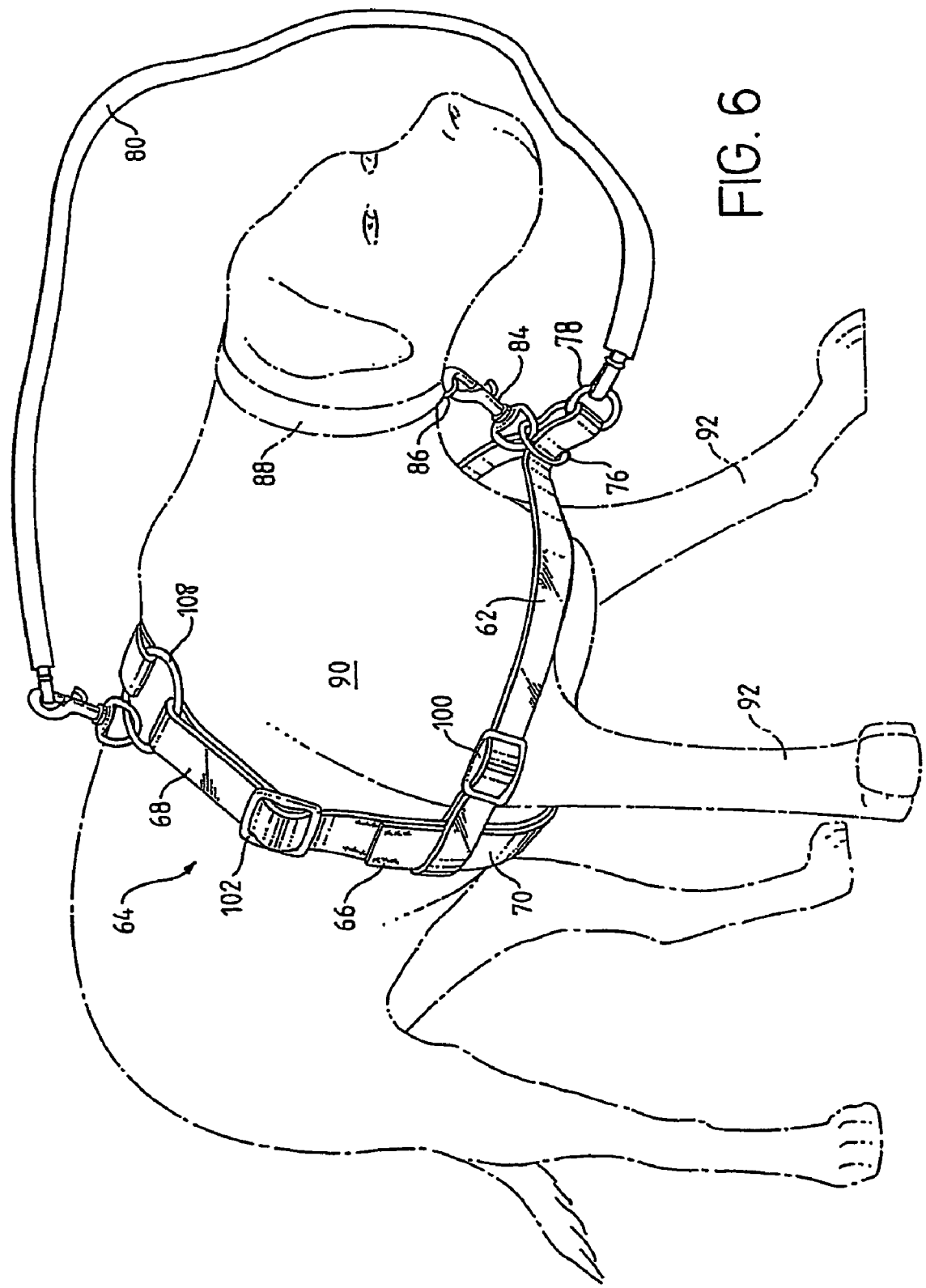
FIG. 6 shows the harness of FIGS. 4 and 5 on a dog.

The harness of the second preferred embodiment of the invention shown in FIGS. 4, 5 and 6 of the drawings is also for a dog. This harness of this embodiment comprises a chest strap 62 each end of which is attached to a trunk loop 64. The ends of the chest strap 62 pass through loops 66 in the trunk loop 64 and are attached to adjusters 100 on the chest strap to secure the chest strap to the trunk loop. The trunk loop 64 comprises a back strap 68 continuous with a lower strap 70. The lower strap 70 includes a clasp 72 by which the trunk loop 64 can be opened.

A loop 74 of the chest strap 62 passes through a cinch ring 76 and is prevented from passing back through the cinch ring by a first lead ring 78 to which a lead 80 can be attached; the portion of the chest strap forming the loop 74 passes through the first lead ring 78. The first lead ring 78 is of a diameter to prevent the cinch ring 76 from coming off the chest strap 62.

In this embodiment the stabilizing link consists of an openable spring clip 84 attached to the cinch ring 76. The spring clip 84 is of such a length that when in place on a dog, it can be attached to a ring 86 which is slidable on the collar 88 of a dog 90, as can be seen in FIG. 3, so that in use the chest strap 62 is in the correct position across the chest of the dog 90.

In addition to the length adjusters 100 provided on the chest 62 strap the back strap 68 is provided with length adjusters 102 and the lower strap 70 is provided with a length adjuster 104 so that the harness can accommodate a range of sizes of dogs. The free end of the trunk loop 64 which emerges from the adjuster 104 in the lower strap 70 is retained by a retaining loop 106 on the lower strap 70.

The back strap 68 is provided with a second lead ring 108, generally in the middle of the back strap 68; ends of the material of the trunk loop 64 are attached to the second lead ring 108 to close the loop.

In use, as can be seen in FIG. 6, the harness 60 is placed on a dog 90 so that the chest strap 62 passes across the chest of the dog in front of its forelegs 92, the back strap 68 passes over the back of the dog in the region of its forelegs 92 and the lower strap 70 passes under the dog immediately behind its forelegs 92. The clasp 72 in the lower strap 70 is opened to allow the harness to be placed around the dog 90 and closed when the harness is in position on the dog.

The stabilizing link clip 84 is attached to a ring 86 slidable on a collar 88 around the neck of the dog. The stabilizing link clip 84 helps to maintain the chest strap 62 in the correct position across the chest of the dog. A lead 80 is attached to the first lead ring 78 on the chest strap 62 and to the second lead ring 108 on the back strap 68. The harness of this embodiment is particularly well suited to use with a single lead 80 having a clip for attachment to a lead ring at each end. The harness of this embodiment is used to control a dog in much the same way as the harness of the first preferred embodiment. When a dog wearing the harness 60 is being walked, the lead 80 can be held so that the end portion attached to the first lead ring 78 on the chest strap 62 is to either the left or right side of the dog. In normal forward walking, the cinch ring 76 and the first lead ring 78 will lie midway across the chest of the dog. If the dog pulls against the lead, it is readily restrained; the stabilizing link clip 84 prevents the chest strap 62 from slipping back on the chest of the dog in this situation.

To turn the dog in the direction of the side of the dog to which the lead passes, the lead is pulled gently in that direction. This causes the back strap 78 to apply gentle pressure to the dog in the region of its opposite shoulder and the dog is encouraged to turn toward the lead. At the same time, the lead 80 is held relatively close to the end attached to the second lead ring 108 on the back strap 68 so that the dog pivots about that end of the lead as it turns. Slippage of the harness 60 around the body of the dog is avoided by the lead ring 76 and the cinch ring 74, and so the stabilizing link clip 84, sliding along the chest strap 62 of the harness in the direction in which the lead is being pulled, and by the action of the lead 80 on the second lead ring 108 and so on the back strap 68. The arrangement of the cinch ring 74 and the first lead ring 76 means that the rings do not slide entirely freely on the chest strap 62, but slide sufficiently to avoid slippage of the harness while gentle pressure is applied to the opposite shoulder of the dog by the back portion 78 of the trunk loop 64. The chest strap 62 is restrained against backward movement on the dog's chest by the stabilizing link clip 84.

To turn the dog in the other direction, the lead can be brought across in front of the dog so that it passes to the other side of the dog; the turning process is then as described above. Alternatively, the lead can remain on the same side of the dog, that is the side opposite to which the dog is to turn. The lead is gently pulled against the neck of the dog to urge it to turn away from the lead. Again, the dog pivots about the end of the lead 80 attached to the second lead ring 108 on the back strap 68 as it turns.

If a dog wearing a harness 60 is reluctant to walk forward, it can be encouraged to do so by gentle pulling of the lead.

The straps of the harnesses 10, 60 are of a webbing material, and some or all of them may be lined with neoprene. The width and thickness of the straps will depend upon the size and strength of the dog for which the harness is intended. Typically, the width of the straps is from 1 cm to 3 cm and the thickness of the straps is about 1 mm.

The leads 30, 80, the collars 38, 88, the rings 36, 86 on the collars 38, 88, and the dogs 40, 90 shown in FIGS. 3 and 6 form no part of the present invention.

The present invention thus provides a harness for dogs and quadruped animals which allows an animal to be readily and effectively controlled by means of a lead without inflicting discomfort on the animal.

The invention claimed is:

1. A harness for a quadruped animal, said harness comprising:
    a chest strap which in use of the harness lies across the chest of the animal in front of the forelegs;
    a trunk loop to which each end of the chest strap is attached and which includes a back strap which in use of the harness lies across the back of the animal affixed to a lower strap which in use of the harness passes under the animal behind the forelegs; and
    a lead ring for a leading strap, the lead ring being slidably mounted on the chest strap for movement along a length of the chest strap in a direction in which the leading strap is being pulled during use; and
    a second attachment for the leading strap, provided on the back strap of the trunk loop; and
    a stabilizing link comprised of a clip and cinch ring, wherein the stabilizing link is attached to the chest strap by a loop of the chest strap passed through the cinch ring, said clip is configured to be attached in use of the harness to a collar around the neck of the animal, and the lead ring is arranged on the chest strap forward of the cinch ring.

2. The harness according to claim 1, wherein the stabilizing link is slidably mounted on the chest strap for movement therealong.

3. The harness according to claim 1, wherein the lead ring for the leading strap is mounted on the said loop of the chest strap whereby the cinch is retained on the chest strap.

4. The harness according to claim 1, wherein the ends of the chest strap are pivotably attached to the trunk loop where the back strap meets the lower strap.

5. The harness according to claim 1, wherein the trunk loop includes a clasp by which the trunk loop can be opened to, in use of the harness, allow the harness to be placed on or removed from an animal.

6. The harness according to claim 1, wherein a length of at least one of the chest strap, the back strap and the lower strap is adjustable.

7. The harness according to claim 1 for a dog.

8. The harness according to claim 1, wherein the lead ring on the chest strap for the leading strap is constrained against free movement along the chest strap.

9. The harness according to claim 1, wherein the second attachment for the leading strap is constrained against free movement along the back strap.

10. The harness according to claim 1, wherein the chest strap is of a polyester webbing.

11. A method of controlling a quadruped animal comprising:
    placing the harness according to claim 1 on the animal;
    attaching a leading strap to the lead ring and the second attachment; and
    attaching the clip to a collar of the animal.

* * * * *